United States Patent [19]

Van Heddegem

[11] 3,771,127

[45] Nov. 6, 1973

[54] CHARACTER RECOGNITION DEVICE

[75] Inventor: Luciaan H. E. Van Heddegem, Edegem, Belgium

[73] Assignee: International Standard Electric Corporation, New York, N.Y.

[22] Filed: Feb. 16, 1972

[21] Appl. No.: 226,815

[52] U.S. Cl. .......... 340/146.3 J
[51] Int. Cl. .......... G06k 9/06
[58] Field of Search .......... 340/146.3 J

[56] References Cited

UNITED STATES PATENTS

| | | | |
|---|---|---|---|
| 3,593,287 | 7/1971 | Kobayashi | 340/146.3 J |
| 3,639,902 | 2/1972 | Dietrich | 340/146.3 J |
| 3,605,093 | 9/1971 | Parks | 340/146.3 J |
| 3,522,586 | 8/1970 | Kiji | 340/146.3 J |

*Primary Examiner*—Maynard R. Wilbur
*Assistant Examiner*—Robert F. Gnuse
*Attorney*—C. Cornell Remsen, Jr.

[57] ABSTRACT

The present synchronization circuit for an optical reader operates as follows: when a pattern read is that of a non-mutilated character, three decision pulses are generated substantially in time coincidence: the first after having recognized a character pattern, the second after having detected the end of a pattern and the third after having detected the beginning of a pattern. When a pattern read corresponds to a mutilated character one or more of these decision pulses are missing and are not in time coincidence. In this case the decision pulse generated first is used to control the decision operation.

21 Claims, 12 Drawing Figures

CHARACTER RECOGNITION DEVICE

The present invention relates to a character recognition device of the type including scanning means for scanning characters to be recognized, a shift register with storage cells, means for storing information signals derived from said scanning into said shift register, and a character recognition circuit coupled to predetermined storage cells of said shift register and producing an output signal each time the pattern of information signals in said shift register corresponds to the scanning of the associated character to be recognized.

Such a character recognition device is already known in the art, e.g., from French Pat. No. 1 222 530.

It is an object of the present invention to provide a character recognition device of the above type including means ensuring a correct timing of the recognition operations in most circumstances, e.g., when the characters to be recognized are badly mutilated, when a black spot is read, when two characters make contact with each other, when there is a black strip in the intercharacter space, etc.

The present character recognition device is particularly characterized in that it further includes a plurality of detection circuits inputs of which are coupled to said shift register and each adapted to detect a distinct feature related to said pattern of information signals in said shift register and to subsequently produce a corresponding decision signal, the outputs of said detection circuits being connected to said character recognition circuit which effects the recognition of said pattern upon the receipt of a said decision signal.

The present invention also relates to a character recognition device of the type including scanning means for scanning characters to be recognized, a shift register with storage cells, means for storing information signals derived from said scanning into said shift register, and a character recognition circuit coupled to predetermined storage cells of said shift register and producing an output signal each time the pattern of information signals in said shift register corresponds to the scanning of the associated character to be recognized, characterized in that it further includes a detection circuit adapted to detect the presence of predetermined patterns in said shift register, to produce on at least one first output one or more pattern signals upon the detection of such a predetermined pattern and to generate at a second output a decision signal derived from one of said pattern signals, and that said first and second outputs of said detection circuit are coupled to inputs of said character recognition circuit which effects a recognition operation based on the pattern signals received at the moment a said decision signal is received.

The above mentioned and other objects and features of the invention will become more apparent and the invention itself will be best understood by referring to the following description of an embodiment taken in conjunction with the accompanying drawings wherein.

Figure 1:
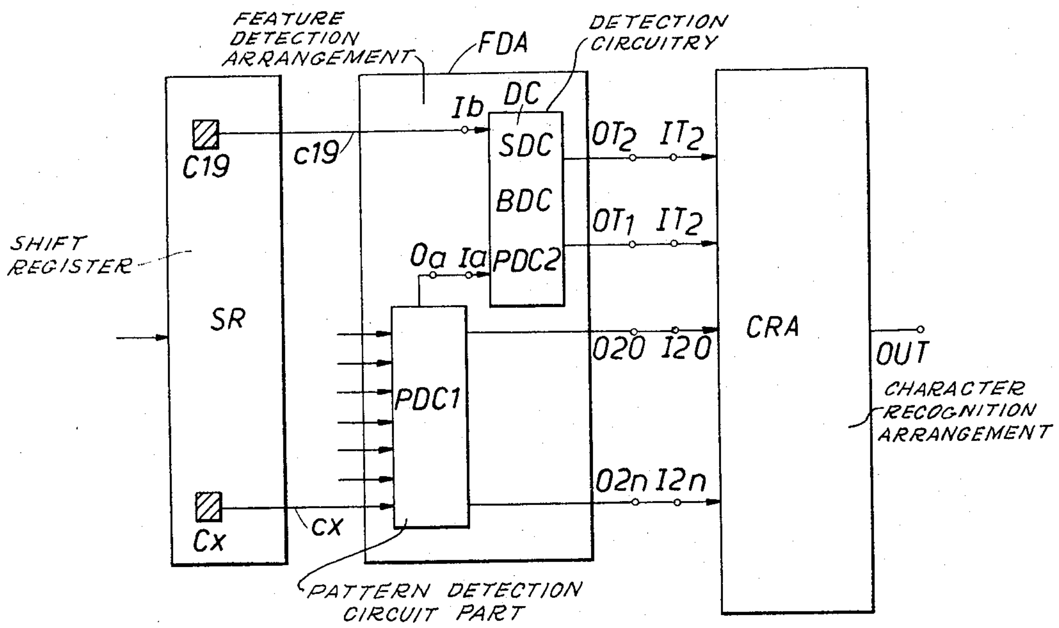
FIG. 1 is a schematic view of a character recognition device according to the present invention.
Figure 4:
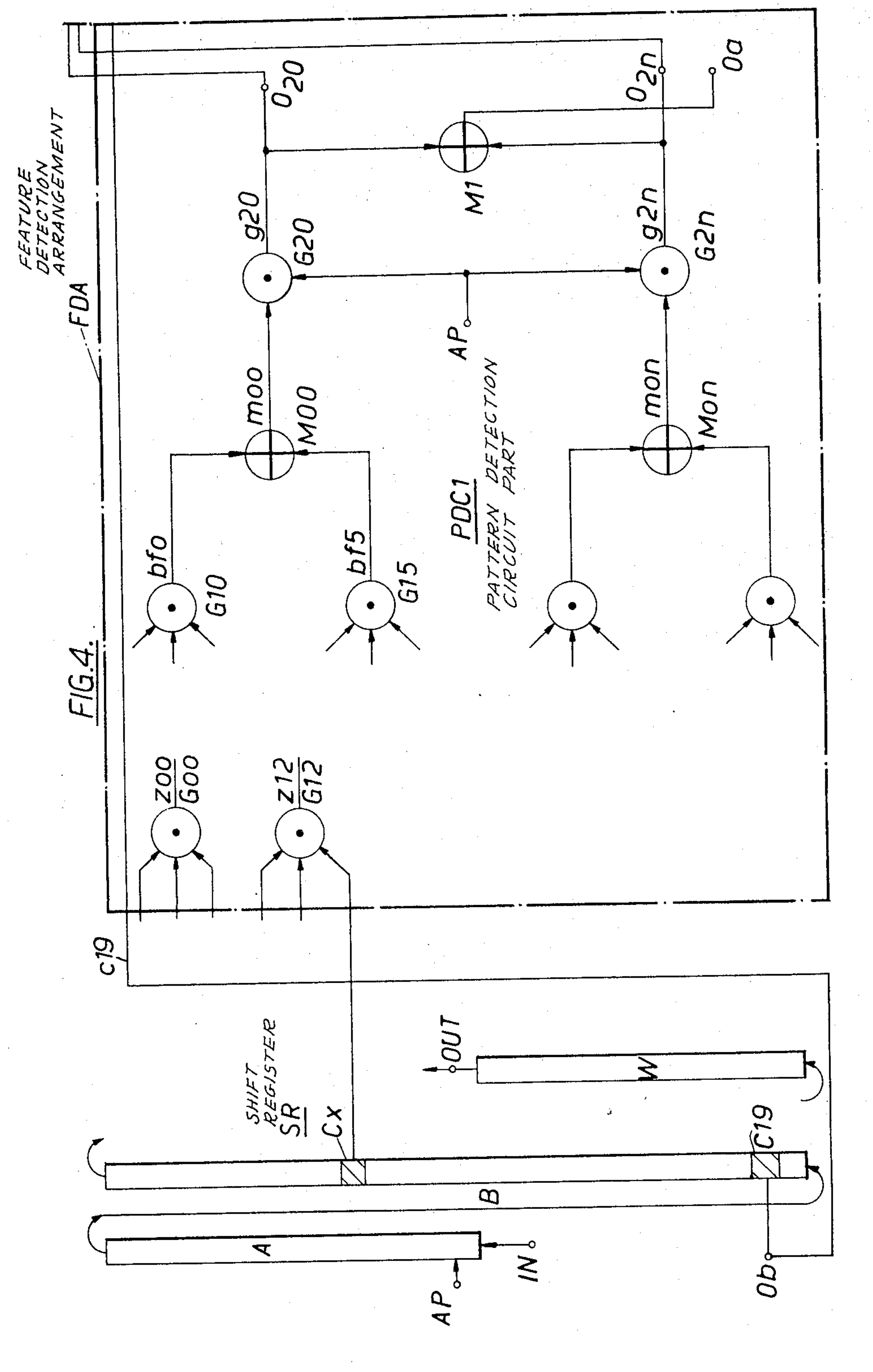
Figure 5:
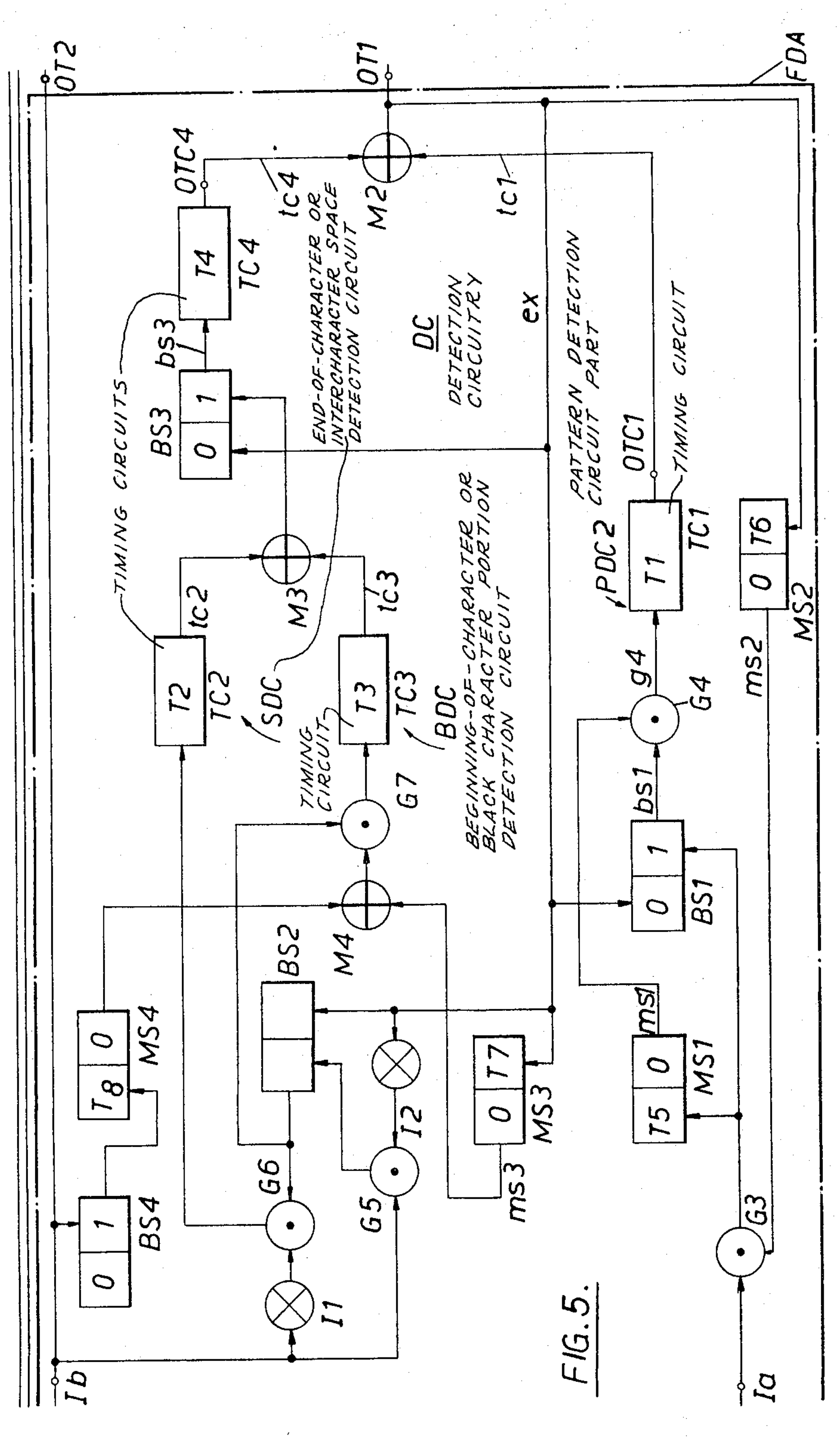
Figure 6:
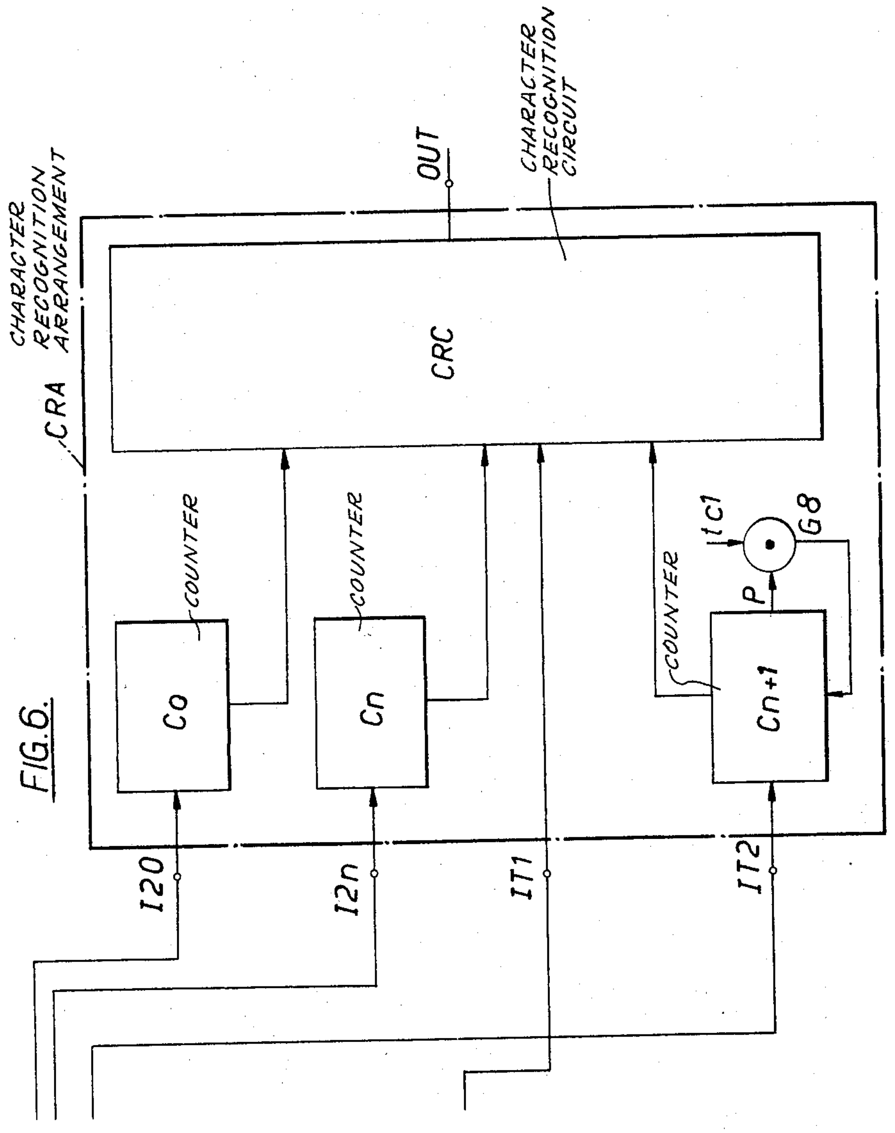
Figures 7, 8:
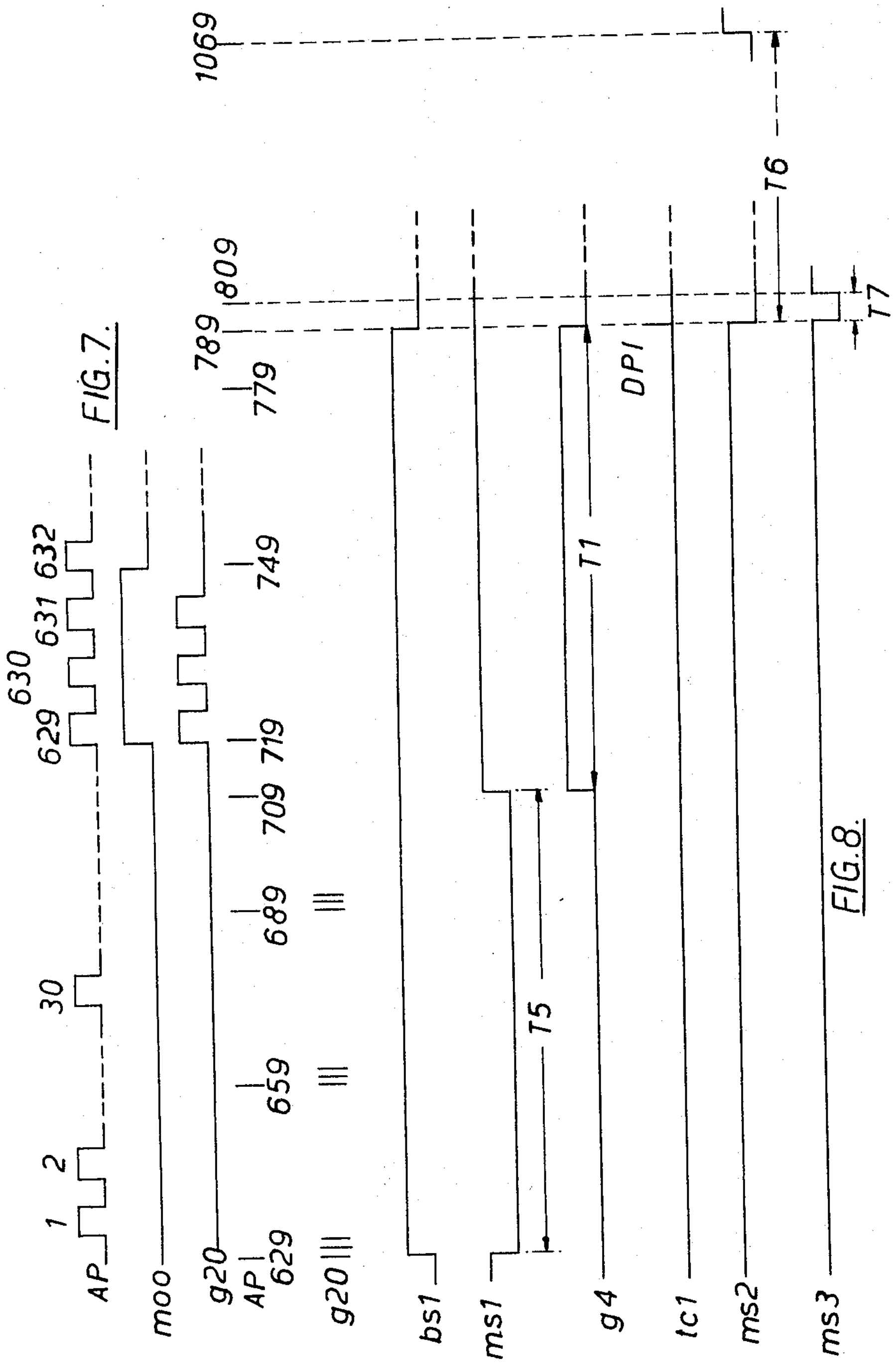
Figure 9:
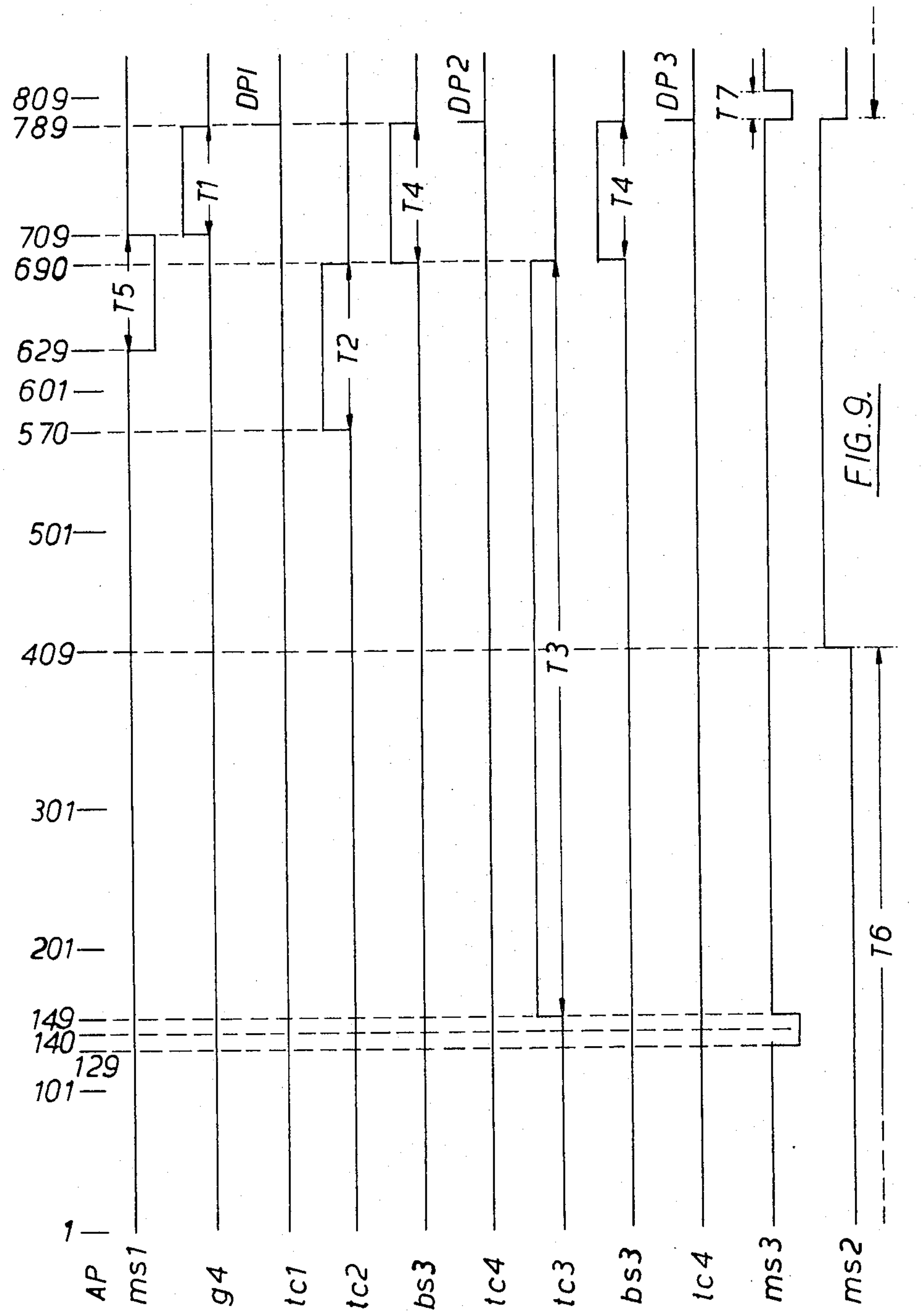
Figure 10:
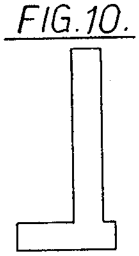
Figure 11:
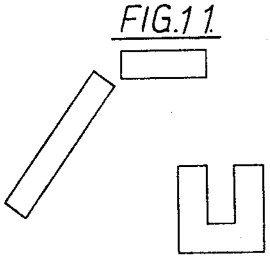
Figure 12:
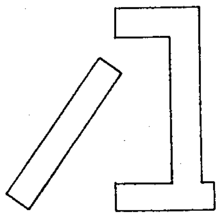

FIGS. 4 to 6 arranged side by side represent the character recognition device of FIG. 1 in more detail;

FIGS. 7 to 9 represent signals generated during the operation of this character recognition device;

FIGS. 10 to 12 show characters processed by this character recognition device.

Principally referring to FIG. 1 the character recognition device shown therein forms part of an optical character reader and includes a shift register SR with 660 binary cells a plurality of which is coupled to a feature detection arrangement FDA. For instance, the binary cells C19 and Cx are connected to the feature detection arrangment FDA via the electric conductors *c*19 and *cx*. This feature detection arrangement FDA includes a pattern detection circuit part PDC1 and detection circuitry DC which is itself constituted by a pattern detection circuit part PDC2, an end of character or intercharacter space detection circuit SDC, and a beginning of character or black character portion detection circuit BDC. An output terminal Oa of the pattern detection circuit part PDC1 and the electric conductor c19 are connected to input terminals I*a* and I*b* of the detection circuitry DC respectively. These input terminals I*a*, I*b* more particularly constitute the input terminals of the circuits PDC2 and SDC, BDC respectively. The output terminals 020 to 02n of the pattern detection circuit part PDC1 and OT1, OT2 of the detection circuitry DC are connected to respective inputs I20 to I2*n* and IT1, IT2 of the character recognition arrangement CRA having a single output terminal OUT.

In brief the operation of the above described character recognition device is as follows. When a character and the surrounding area are scanned the binary information signals resulting therefrom are successively entered in the shift register SR. The pattern detection circuit part PDC1 when detecting a character pattern in the information thus stored in the shift register SR produces a number of pattern pulses which are applied to the arrangement CRA, for being recognized, via the output and input terminals 020–02*n* and I20–I2*n*. These pattern pulses are also applied to the pattern detection circuit part PDC2 which generates a decision signal a predetermined time interval later. When the detection circuits SDC and BDC in consulting the contents of the binary cell C19 detect the presence of an intercharacter space and of a black character portion respectively, they each produce a decision signal a predetermined time interval after this detection respectively. The decision signals which have thus eventually been produced are applied to the arrangement CRA via an electric conductor with output and input terminals OT1 and IT1. The number of black portions detected in cell C19 is further also registered in the arrangement CRA via an electric conductor with output and input terminals OT2 and IT2. In the arrangement CRA the recognition decision, i.e., the decision regarding the fact that the eventually received pattern pulses and the number of black portions registered belong to a character or not is taken upon the receipt of the first of the three possible decision signals. These signals are normally in time coincidence but may be shifted with respect to each other due to the character to be recognized being mutilated.

Figure 2:
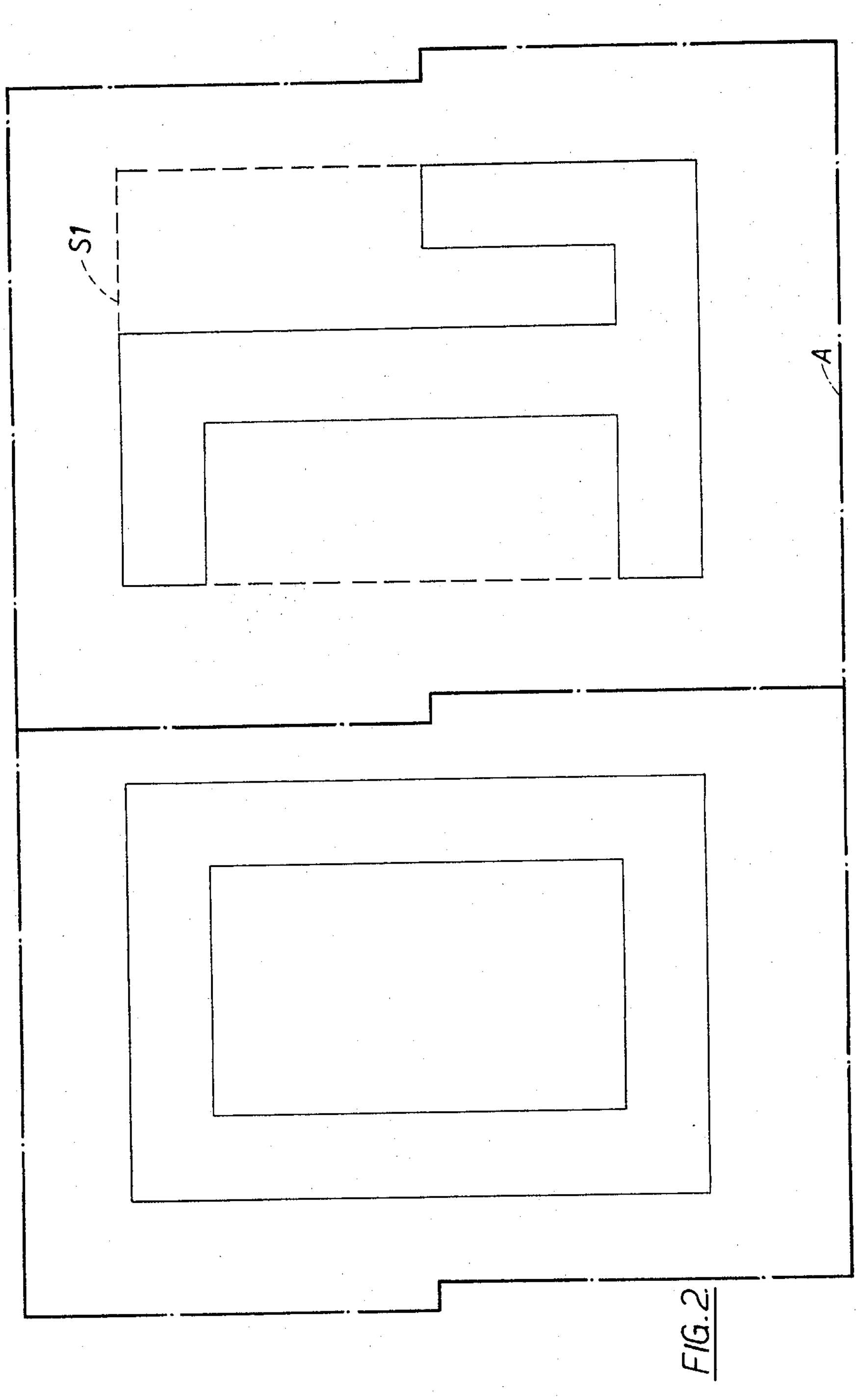
FIG. 2 shows characters which can be recognized by the character recognition device of FIG. 1.
Figure 3:
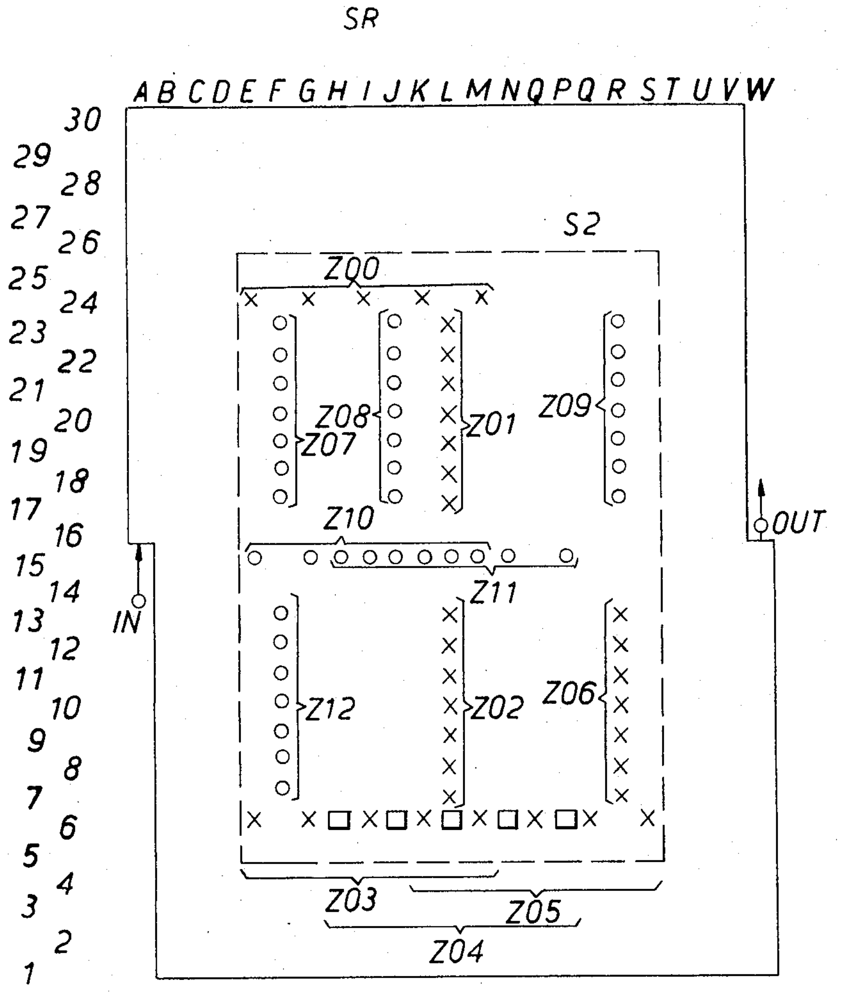
FIG. 3 is a schematic view of a shift register and associated detection means included in the character recognition device shown in FIG. 1.

Principally referring to the FIGS. 2 and 3 the optical character reader referred to above is adapted to scan areas A each along 23 columns and 30 rows, these columns the outermost ones of which are half ones being scanned from top to bottom starting with the outermost right column. A character located in this area A normally covers part of a surface S1 of 15 columns and 21 rows and is constituted by horizontal and vertical black zones having a width of 3 rows and 3 columns respectively. FIG. 2 shows such characters and more particularly the stylized OCR-A characters "1" and "0".

The electric 1-and 0-binary pulses resulting from the scanning of black and white portions of an above mentioned area A are successively entered in the binary cells of the shift register SR (FIG. 3) by means of advancing pulses. When a character is substantially correctly located in the scanned area A and when the binary information signals resulting from the scanning of this area have all been entered in the shift register SR by 660 advancing pulses, the binary information corresponding to the character occupies the substantially centrally located surface S2 of this shift register SR, the binary cells of which are shown to be arranged in 23 columns A to W, the columns A, W and B to V each comprising 15 and 30 cells respectively.

The various binary cells of the shift register SR used to detect the character pattern 1 shown in FIG. 2 and more particularly to detect the various black and white zones thereof are represented on FIG. 3. Each character pattern is detected when a plurality of predetermiend zones are simultaneously present. For instance, for the character 1 the detection cells adapted to detect the black zones Z00 to Z06 are indicated by small crosses and squares, whereas those adapted to detect the white zones Z07 to Z12 are indicated by small circles and dots. For instance, a 1 is detected when one of the following Boolean functions is true :

$$Bf0 \equiv Z01\ Z02\ Z03\ Z04\ Z05\ Z06\ \overline{Z07}\ \overline{Z09}\ \overline{Z12}$$
$$Bf1 \equiv Z00\ Z01\ Z03\ Z04\ Z05\ Z06\ \overline{Z07}\ \overline{Z09}\ \overline{Z12}$$
$$Bf2 \equiv Z00\ Z01\ Z02\ Z03\ Z04\ Z05\ \overline{Z07}\ \overline{Z09}\ \overline{Z12}$$
$$Bf3 \equiv Z00\ Z01\ Z02\ Z03\ \overline{Z06}\ \overline{Z07}\ \overline{Z09}\ \overline{Z10}$$
$$Bf4 \equiv Z00\ Z01\ Z02\ Z05\ Z06\ \overline{Z07}\ \overline{Z09}\ \overline{Z12}$$
$$Bf5 \equiv Z00\ Z02\ Z03\ Z04\ Z05\ Z06\ \overline{Z07}\ \overline{Z08}\ \overline{Z09}\ \overline{Z12}$$

wherein Z00 to Z12 are Boolean functions which are true when the corresponding zones are detected, i.e. :

for the vertical zones when four of the seven binary cells indicated generate an activating signal, namely two of the three middle ones and one of each of the two pairs of outer ones;

for the horizontal zones when three of the five binary cells indicated provide an activating signal, namely two of the three middleones and one of the two outer ones.

Hereby it should be noted that the :

zone Z03 is detected by the five left hand cells indicated by the crosses;

zone Z04 is detected by the five central cells indicated by the squares;

zone Z05 is detected by the five right hand cells indicated by the crosses;

zone Z10 is detected by the five left hand cells indicated by the circles;

zone Z11 is detected by the five central cells indicated by the dots.

Principally referring to FIG. 4 the pattern detection circuit part PDC1 shown therein includes a plurality of first AND-gates provided for detecting distinct ones of the zones of the characters to be recognized. These gates are therefore coupled to corresponding binary cells of the shift register. For instance, the first AND-gates G00 to G12 are provided for detecting the above mentioned zones Z00 to Z12 of the character 1 and the input of these gates are therefore coupled to the corresponding binary cells such as Cx via electric conductors such as cx. The outputs of these gates are indicated by *z*00 to *z*12 respectively.

Since, as mentioned above, a character 1 is detected when one of the Boolean functions Bf0 to Bf5 is true the outputs *z*00 to *z*12 of the first AND-gates G00 to G12 are connected to inputs of second AND-gates G10 to G15 in such a manner that the latter define these Boolean functions at their respective outputs bf0 to bf5. These outputs are connected to mixer M00 which is hence activated when the character 1 is detected.

In an analogous way as described above for the character 1 a set of first and second AND-gates and a mixer are provided for the detection of each of the other characters. One of these mixers is for instance Mon.

The outputs *moo* to *mon* of the mixers Moo to Mon are each connected to the input of a corresponding one of the two-input third AND-gates G2o to G2n the other inputs of which are controlled by the advancing pulses AP of the shift register SR. The output terminals O2*o* to O2*n* of these gates and the output terminal Oa of the mixer M1, the inputs of which are connected to these output terminals O2*o* to O2*n*, constitute the output terminals of the pattern detecting circuit part PDC1. The output terminal O2*o* to O2*n* are connected to the respective input terminals I2*o* to I2*n* of the decision arrangement DSA shown in FIG. 6, and the output terminal O*a* is connected to an input terminal I*a* of the detection circuitry DC represented in FIG. 5. Another input terminal I*b* of the latter circuit DC is coupled to the electric conductor *c*19 which is connected to the 1-output (not shown) of the nineteenth binary cell C19 of the shift register SR, this cell being constituted by a bistate device.

Principally referring to FIG. 5 the detection circuit DC shown therein includes :

the bistate devices BS1 to BS4 which are triggered in their 1-condition when the leading edge of a positive signal is applied to their 1-input;

the monostable devices MS1 to MS4 with time constants T5 to T8 respectively;

the timing circuits TC1, TC2, TC3 and TC4 with time constants T1, T2, T3 and T4 respectively. These circuits are obvious integrator circuits adapted to generate an output pulse when a positive input signal has been applied to them for a duration at least equal to T1, T2, T3 and T4 respectively;

the AND-gates G3 to G8;

the OR-gates or mixers M2 to M4;

the inverters I1 and I2.

The values of the time constants T1 to T7 are as follows :

T1 = 40 microseconds;
T2 = 60 microseconds;
T3 = 270.5 microseconds;
T4 = 49.5 microseconds;
T5 = 40 microseconds;
T6 = 140 microseconds;
T7 = 10 microseconds;
T8 = 60 microseconds.

As already mentioned above the detection circuitry DC is constituted by a pattern recognition circuit part PDC2, an intercharacter space detection circuit SDC, and a black character portion detection circuit BDC.

The circuit PDC2 has an input which constitutes the input terminal I*a* of the detection circuitry DC and an output terminal OTC1 which is connected to the output terminal OT1 of the detection circuitry DC via the output lead $tc1$ and the mixer M2. The circuits SDC and BDC have a common input which constitutes the input terminal $Ib$ of the detection circuitry DC and a common output terminal OTC4 which is connected to the output terminal OT1 via the output lead $tc4$ and the mixer M2. The input terminal $Ib$ is further also directly connected to the output terminal OT2 of the detection circuitry DC.

Principally referring to FIG. 6, the output terminals OT1 and OT2 of the detection circuitry DC are connected to the input terminals IT1 to IT2 of the character recognition arrangement CRA which comprises the counters Co to Cn+1 and the character recognition circuit CRC. More particularly the input terminals I2o to I2n and IT2 of the arrangement CRA are connected to the input terminals of the counters Co to Cn and Cn+1 respectively. Outputs of these counters Co to Cn+1 and the input IT1 of the arrangement CRA are connected to inputs of the character recognition circuit CRC the output OUT of which constitutes the output of the character recognition arrangement.

Referring to the FIGS. 2 to 9 the operation of the above character recognition device is hereinafter described in detail, it being supposed that the character 1 shown in FIG. 2 is read. When the area A a surface S1 of which is partially covered by this character 1 is scanned the binary 1-and 0-signals resulting from the reading of the black and white portions of this area are successively entered in the shift register SR (FIGS. 3, 4) and shifted therethrough by the advancing pulses AP. In this way the character pattern is shifted into every possible position within the shift register SR. More particularly this pattern is shifted therein from bottom to top and from left to right. When the binary 1-signal corresponding to the first portion of the scanned area is entered in the shift register by an advancing pulse which is called AP1, it is clear that the character 1 is detected in the pattern detection circuit PDC1 upon the occurrence of the advancing pulses, AP629, AP630, AP631; AP659, AP660, AP661 and AP689, AP690,AP691 bearing in mind that for AP660 the binary information corresponding to the character 1 is exactly situated within the surface S2 of the shift register and that the width of the horizontal and vertical portions of the character is equal to three rows and three columns respectively.

The output moo of the mixer Moo included in the PDC1 is hence activated during three time intervals each equal to three advancing pulse periods and having a duration of 1.5 microseconds. Only the first of these time intervals is shown in FIG. 7. The output of the mixer Moo being gated by the advancing pulses AP in the gate G20, it is clear that a series of three times three advancing pulses appears at the output of this gate. Only the first three of these advancing pulses AP629, 630 and 631 are shown on FIG. 7. This series of advancing pulses is however completely shown on FIG. 8 on a reduced scale.

The series of three times three advancing pulses resulting from the detection of a character pattern are hereinafter called pattern pulses, although they are identified in the same way as the advancing pulses. These pattern pulses are applied, on the one hand to the input of the counter Co via the gate output $g20$, the output terminal O2o and the input terminal I2o, and on the other hand to the input terminal $Ia$ of the detection circuitry DC (FIG. 5) via the mixer M1.

During the detection of the character 1 it may happen that not only the counter Co is stepped by pattern pulses, but that also one or more of the other counters C1 to Cn are stepped one or more times by such pulses due to other patterns being detected. This may happen for instance when the character 1 is mutilated.

The pattern detection circuit part PDC2 included in the detection circuitry DC is operated by the above mentioned pattern pulses generated by the partern detection circuit part PDC1. The first of these pulses AP629 (FIG. 8) triggers the bistate device BS1 to its 1-condition via the AND-gate G3 due to which the 1-output $bs1$ of this bistate device and hence one input of the two-input AND-gate G4 are activated. This first pattern pulse AP629 however also triggers the monostable device MS1 to its unstable or 1-condition so that the 0-output ms1 of this device is de-activated for a time interval T5 which is equal to 40 microseconds, i.e., to the duration of 80 advancing pulses. Consequently the other eight pattern pulses have no influence and the output g4 of the gate G4 is only activated at the occurrence of AP709. Supposing that the latter output g4 then remains activated during a time interval larger than T1 which is equal to 40 microseconds, due to the absence of false pattern pulses, a first decision pulse DP1 of, e.g., 1 microsecond is generated at the output terminal OTC1 of the timing circuit TC1 in time coincidence with AP789 and applied to the output terminal OT1 of the synchronization circuit SC via the electric conductor $tc1$ and the mixer M2. From there it is applied to the input IT1 of the character recognition arrangement CRA (FIG. 6). Since AP789 is in fact AP129 of a new series of 660 advancing pulses the decision pulse DP1 is hence generated when information of a following character is already being entered in the shift register SR.

Via the output lead ex the first decision pulse DP1 is applied to the 0-input of the bistate device BS1 which is reset to its 0-condition so that the circuit PDC2 is prepared for a new operation and to the 1-input of the monostable device MS2 which is thus triggered to its unstable or 1-condition. Consequently the input $ms2$ of the AND-gate G3 is inhibited for a time interval T6 equal to 140 microseconds due to which the operation of the circuit inhibited. Indeed, it cannot be influenced during that period T6 by false pattern pulses eventualy applied to the input terminal Ia after the AP789. Since 140 microseconds correspond to 280 advancing pulses the output ms2 of the monostable device MS2 is inhibited from AP789 to AP1069 or to AP409 of the above mentioned new series of 660 advancing pulses.

Via the output head ex the first decision pulse DP1 is also applied to :

the 0-inputs of the bistate devices BS2 and BS3, due to which the circuits SDC and BDC are reset and prepared for a new operation;

an input of the AND-gate G5 via the inverter I2 due to which this gate is inhibited for the duration of the decision pulse DP1.

the 1-input of the monostable device MS3 which is thus triggered to its unstable or 1-condition for a time interval T7 equal to 10 microseconds. Consequently its 0-output $ms3$ is de-activated and hence the AND-gate G7 and the circuit BDC are inhibited for the same time interval. Since a duration of 10 microseconds corresponds to that of 20 advancing pulses the inhibition time interval T7 extends from AP789 to AP809 or from AP129 to AP149 of the new series of 660 advancing pulses.

From the above it follows that the decision pulse DP1 not only resets the circuit PDC2 but also prevents the circuits SDC AND BDC from generating decision pulses via the output lead ex which may therefore be considered as forming an exclusion circuit. As will become clear later a decision pulse always prevents other decision pulses from being generated.

Before considering the other detection circuits SDC and BDC the following should be noted. When a 1-signal corresponding to a black character portion is registered in the binary cell C19 of the shift register SR the input I*b* of the detection circuitry DC is activated due to which the bistate device BS2 is triggered in its 1-condition via AND-gate G5, except when a decision pulse is being generated since gate G5 is then inhibited for a duration of 1 microsecond. The activated 1-output of the bistate device BS2 enables the AND-gate G6.

The end of character or intercharacter space detection circuit SDC operates as follows after the bistate device BS2 has been brought in its 1-condition.

The input of the timing circuit TC2 is activated via the inverter I1 and the AND-gate G6 each time the input terminal I*b* which is connected to the 1-output (not shown) of the binary cell C19 of the shift register Sr is de-activated, i.e., when a binary 0-signal corresponding to a white portion of the character read is registered in this binary cell C19. Each time a 1-signal is registered in the latter cell the timing circuit TC2 is reset to its non-operative condition. However, when successive 0-signals, e.g., those corresponding to an intercharacter space are successively registered in the binary cell C19 of the shift register SR so that the 1-output of this cell remains de-activated for a period at least equal to T2, the timing circuit TC2 is operated and generates an output pulse a time interval T2 equal to 60 microseconds after the occurrence of the first 0-signal of the series. In other words, when a white space having a time duration at least equal to T2 is detected between two characters an output pulse is generated a time interval T2 of 60 microseconds after the start of this space. Since the first 0-signal corresponding to the first white portion of the intercharacter space is always registered in the binary cell C19 of the shift register SR by the advancing pulse AP570 (FIG. 9), the pulse at the output tc2 of the timing circuit TC2 substantially appears in time coincidence with AP690. The latter output pulse triggers the bistate device BS3 to its 1-condition via the mixer M3. Consequently the output bs3 of the latter device and hence the input of the timing circuit TC4 are activated. When this activation remains for a period at least equal to T4 a second decision pulse DP2 is generated a time interval T4 equal to 49.5 microseconds after the activation of the 1-output of the bistate device BS3. This second decision pulse DP2 is applied to the output terminal OT1 via the mixer M2 and from there to the input terminal IT1 of the character recognition arrangement CRA.

Since the time interval T4 of 49.5 microseconds corresponds to the duration of 99 advancing pulses, the second decision pulse DP2 is generated upon the occurrence of AP789, i.e., in time coincidence with the first decision pulse DP1, as shown in FIG. 9. The decision pulse DP2 has the same effect as the decision pulse DP1 and hence prevents other decision pulses from being generated.

The beginning of character or black character portion detection circuit BDC may also operate after the bistate device BS2 has been set to its 1-condition and on condition that gate G7 is not inhibited due to a decision pulse having been generated. Indeed, if after the gate G7 has been enabled the bistate device BS2 remains in the 1-condition for a period at least equal to T3 which is equal to 270.5 microseconds an output pulse is generated at the output *tc*3 of the timing circuit TC3 due to which the bistate device BS3 is triggered to its 1-condition. In the same manner as described for the circuit SDC a third decision pulse DP3 may then be generated at the output terminal OTC4 of the timing circuit TC4 and hence at the output terminal OT1 of the detection circuitry DC. This third decision pulse DP3 is also applied to the character recognition arrangement and occurs in time coincidence with these pulses. Indeed, since the AND-gate G7 is enabled upon the occurrence of AP149 and since the time interval T3+T4 is equal to 320 microseconds or to the duration of 640 advancing pulses the decision pulse DP3 is generated in time coincidence with AP789. This decision pulse DP3 has the same effect as the decision pulses DP1 and DP2.

The input terminal Ia of the detection circuit DC is further also connected to the counter Cn+1 of the arrangement CRA via the output terminal OT2 and the input terminal IT2. This counter Cn+1 thus registers the number of 1-pulses resulting from the scanning of black character portions.

Upon the receipt of a decision pulse the character recognition arrangement evaluates the positions of the pattern counters Co to Cn and of the black portion counter Cn+1 which should have counted a predetermined number and decides if the character pattern has been recognized or not. After the decision has been taken the counters Co to Cn+1 are reset (not shown) by the CRC.

In the above described device the decision pulses DP1, DP2 and DP3 are generated in time coincidence since the character 1 read is an ideal one. However, this will not be the case when the character read is mutilated. Anyhow the first of the decision pulses generated will prevent other decision pulses from being generated.

Instead of normally generating the decision pulses in time coincidence one may also design the device in such a way that there is a time shift between them.

The above described detection circuitry DC permits to make a correct decision even if the characters read are badly mutilated, as for instance those shown in FIGS. 10 to 12.

Principally referring to FIG. 10 the character 1 shown therein will not be detected by the circuit part PDC1 since none of the Boolean functions Bf0 to Bf5 is true due to Z00 and Z05 being both not true. Consequently no pattern pulses and hence no first decision pulse DP1 will be produced. Since the right hand part of the character is mutilated by the absence of black the above described circuit BDC will react and try to generate a third decision pulse DP3 at a moment much later than indicated on FIG. 9. However, the circuit SDC generates a decision pulse DP2 at this moment and consequently resets the circuit BDC which is hence prevented from generating a third decision pulse DP3.

Principally referring to FIG. 11 the character 1 represented therein will again not be detected by the circuit part PDC1 since none of the Boolean functions Bf0 to Bf5 is true due to Z00 to Z03 being both not true. Consequently no pattern pulses and hence no first decision pulse DP1 will be generated. Due to the presence of a black stripe in the space following the character also no second decision pulse DP2 will be generated. However, the circuit BDC generates a decision pulse DP3 at the moment indicated in FIG. 9 and restores the other detection circuits, if necessary.

Principally referring to FIG. 12 the character 1 represented therein is detected by the circuit PDC so that pattern pulses and a first decision pulse DP1 are generated. This pulse will hence make it possible to make a recognition decision although the circuit SDC cannot generate a second decision pulse DP2 due to the presence of a black stripe in the space following the character and that the circuit BDC would generate a decision pulse DP3 at a moment much later than that indicated on FIG. 9.

When a black spot is read by the recognition device the counter Cn+1 will not reach the above mentioned position and also no decision pulse will be generated to reset this counter. However, this will happen by the pulse appearing at the output of AND-gate G8 after a space following the black spot has been detected since this gate G8 is controlled by the output tc1 of the timing circuit TC1 and by the output *p* of the counter Cn+1 the latter output *p* being activated as long as this counter has not reached its said predetermined position.

In connection with the choice of the above mentioned time constants T1 to T8 the following should be noted.

As described above the detection circuit part PDC2 generates a decision pulse DP1 a time interval T5+T1 equal to 80 microseconds after the detection of the first pattern pulse, the operation of this circuit being then inhibited for a time period T6 equal to 140 microseconds.

The time interval T5 has been chosen equal to 40 microseconds in order that the circuit PDC2 should only react to the first of the pattern pulses, bearing in mind that the time period between the first and the last pattern pulses is equal to 31 microseconds.

The time interval T1+T5 has been chosen equal to 80 microseconds in order that a false pattern pulse produced less than 80 microseconds before a correct pattern pulse should have no influence on the decision. Indeed, upon the occurrence of such a correct pattern pulse less than 80 microseconds after a false pattern pulse the monostable device MS1 which was set by the false pattern pulse is again triggered to its unstable condition so that a renewed time count of T5+T1 is started. Alternatively one may state that a first decision signal is generated after the cocurrence of a correct pattern signal on condition that no other pattern signal is produced within the time interval T1+T5 and after a time interval T5 thereof has elapsed.

The inhibition time interval T6 has been chosen equal to 140 microseconds in order that the circuit PDC2 should be able to generate a decision signal even when two characters make contact with each other. Indeed, in this case the time interval between the first pattern pulses corresponding to these characters is equal to 225 microseconds, which corresponds to the time period required for scanning 15 columns, so that T6 has to be smaller than 225−80 = 145 microseconds, e.g., 140 microseconds. In other words, T1+T5+T6 must be smaller than the minimum possible time interval elapsing between two pattern signals related to immediately following character patterns and giving each rise to a decision signal.

With regard to the detection circuit BDC the following should be noted.

The third decision pulse DP3 must normally be generated a time interval of 330 microseconds before AP789 or at AP129 upon the detection of the first black portion of a character. However, this first black portion does not occupy a constant position in the character and for instance appears as a 1-signal in the first cell of the shift register between AP111 at the earliest and AP122 at the latest. Therefore, while it is possible to detect the earliest possible black portion at AP129 in cell C19 of the shift register, it is impossible to detect at AP129 and in cell C19 the first black portions which occur later, since at AP129, for instance the 1-signal corresponding to the latest black portion is registered in cell 8. In order to be independent of the first black portion the occurrence of this first black portion is registered in the bistable device BS2 and the detection of black portions is inhibited for a time period T7 of 10 microseconds or 20 advancing pulses and T3+T4 is chosen equal to 320 microseconds. In this way, after the 1-signal corresponding to a black portion has been registered in the bistable device BS2, the timing T3+T4 is started at AP149 so that the decision pulse DP3 is generated in time coincidence with the first decision pulse DP1.

In connection with the detection circuit SDC the following should be remarked.

The first white portion of a space between two characters occupies a fixed position so that it is possible to detect this first white portion in an arbitrary cell of the shift register and to choose the value of the time interval T2+T4 in such a manner that a decision pulse DP2 is produced in time coincidence with DP1, i.e., with AP789. For instance, when using cell 1 of the shift register to detect the first white portion of a space one must choose T2+T4 equal to 118.5 microseconds or to 237 advancing pulses since the 0-signal corresponding to this first white portion is registered in cell 1 at AP552, i.e., 237 advancing pulses before AP789.

However, in order to be able to use the same detection cell C19 as the one used by the detection circuit BDC, the value of the time interval is chosen equal to 109.5 microseconds or 219 advancing pulses. Indeed, the 0-signal corresponding to the first white portion of a space is detected in cell C19 at AP570, i.e., 219 advancing pulses before AP789.

In order that a white space, e.g., within a character, smaller than 60 microseconds should not be detected the time constant T2 is taken equal to 60 microseconds. Consequently the time constant T4 is equal to 49.5 microseconds. Instead of providing two completely separate circuits for counting the time intervals T2+T4 and T3+T4 use is made of the same timing circuit TC4 for counting T4. Therefrom it follows that T3 is equal to 270.5 microseconds.

As described above the AND-gate G7 is inhibited for a time period T7 after the occurrence of a decision pulse. Obviously this is not true for the first character to be recognized since there has been no previous decision pulse. For this reason the 1-signal corresponding to the first black portion of a first character to be recognized is applied to the bistable device BS4 which is thus triggered to its 1-condition. Consequently the monostable device MS4 is triggered to its unstable condition for a time interval T8 equal to 60 microseconds so that the AND-gate G7 is inhibited for that time interval. The bistable device BS4 is reset to its 0-condition after a whole line of characters has been read (not shown).

While the principles of the invention have been described above in connection with specific apparatus, it is to be clearly understood that this description is made only by way of example and not as a limitation on the scope of the invention.

I claim:

1. An improved character recognition device of the type including scanning means for scanning characters to be recognized, a shift register with storage cells, means for storing information signals derived from the scanning means into the shift register, and a character recognition circuit coupled to predetermined storage cells of the shift register and producing an output signal each time the pattern of information signals in the shift register corresponds to the scanning of the associated character to be recognized, wherein the improvement comprises a plurality of detection circuits, inputs of which are coupled to said shift register and each adapted to detect a distinct feature related to said pattern of information signals in said shift register and to subsequently produce a corresponding decision signal, the outputs of said detection circuits being connected to said character recognition circuit which effects the recognition of said pattern upon the receipt of a said decision signal, wherein a first one of said detection circuits includes a first circuit part to detect the presence of predetermined patterns of information signals in said shift register and to produce at its output one or more pattern signals upon the detection of such a predetermined pattern, and a second circuit part to generate at its output a first decision signal a first predetermined time interval after one of said pattern signals has been produced, and wherein said outputs of said first and second circuit parts are coupled to said character recognition circuit in order to feed said pattern signals and said first decision signal thereto respectively, said second circuit being adapted to generate said first decision signal said first predetermined time interval after the occurrence of a said pattern signal on condition that no other pattern signal is produced within said first time interval and after a second time interval thereof has elapsed.

2. The character recognition device according to claim 1 further including exclusion means for preventing other decision signals from being generated upon a detection circuit having produced such a decision signal.

3. The character recognition device according to claim 1 wherein the decision signals produced by said detection circuits are normally substantially in time coincidence with each other.

4. The character recognition device according to claim 1 wherein the outputs of said detection circuits are intercoupled to form a common output which is connected to said character recognition circuit.

5. The character recognition device according to claim 1 wherein said second circuit part includes first inhibiting means for preventing a pattern signal occurring less than said second time interval after another pattern signal from giving rise to a said first decision signal.

6. The character recognition device according to claim 5 wherein said second circuit part includes a first bistable device, a first monostable device constituting said inhibiting means with a timing equal to said second time interval, a first timing circuit adapted to produce an output signal after its input has been activated for a third time interval equal to the difference between said first and second time intervals, and a first AND-gate, wherein said pattern pulses are fed to the 1-inputs of said first bistable and monostable devices, the respective 1-and 0-outputs of which are connected to said first AND-gate, and wherein the output of said first AND-gate is connected to the input of said first timing circuit, the output of which constitutes the output of said first detection circuit.

7. The character recognition device according to claim 6 wherein said common output of said detection circuits is connected to the 0-output of said first bistable device.

8. An improved character recognition device of the type including scanning means for scanning characters to be recognized, a shift register with storage cells, means for storing information signals derived from the scanning means into the shift register, and a character recognition circuit coupled to predetermined storage cells of the shift register and producing an output signal each time the pattern of information signals in the shift register corresponds to the scanning of the associated character to be recognized, wherein the improvement comprises a plurality of detection circuits, inputs of which are coupled to said shift register and each adapted to detect a distinct feature related to said pattern of information signals in said shift register and to subsequently produce a corresponding decision signal, the outputs of said detection circuits being connected to said character recognition circuit which effects the recognition of said pattern upon the receipt of a said decision signal, wherein a first one of said detection circuits includes a first circuit part to detect the presence of predetermined patterns of information signals in said shift register and to produce at its output one or more pattern signals upon the detection of such a predetermined pattern, and a second circuit part to generate at its output a first decision signal a first predetermined time interval after one of said pattern signals has been produced, and wherein said output of said first and second circuit parts are coupled to said character recognition circuit in order to feed said pattern signals and said first decision signal thereto respectively, said second circuit part including second inhibiting second means operated by each of said decision signals and preventing a first decision signal from being generated a predetermined fourth time interval after the occurrence of one of said decision signals.

9. The character recognition device according to claim 8 wherein the sum of said first and fourth time intervals is smaller than the minimum possible time interval elapsing between the occurrence of two pattern signals related to immediately following character patterns and giving rise each to a decision signal.

10. The character recognition device according to claim 8 wherein said second inhibiting means includes a second monostable device having a timing equal to said fourth time interval and a 1-input coupled to said common output of said detection circuits, and wherein said pattern signals are fed to said first monostable and bistable devices via a second AND-gate which is controlled by the 0-output of said second monostable device.

11. An improved character recognition device of the type including scanning means for scanning characters to be recognized, a shift register with storage cells, means for storing information signals derived from the scanning means into the shift register, and a character recognition circuit coupled to predetermined storage cells of the shift register and producing an output signal each time the pattern of information signals in the shift register corresponds to the scanning of the associated character to be recognized, wherein the improvement comprises a plurality of detection circuits, inputs of which are coupled to said shift register and each adapted to detect a distinct feature related to said pattern of information signals in said shift register and to subsequently produce a corresponding signal, the outputs of said detection circuits being connected to said character recognition circuit which effects the recognition of said pattern upon the receipt of a said decision signal, wherein a second of said detection circuits is adapted to detect the end of a character pattern stored by means of information signals in said shift register and to subsequently produce at its output a second decision signal after such detection, and wherein said second detection circuit includes a first registering means to register the occurrence in a predetermined first storage cell of said shift register of an information signal representing a black or substantially black portion of a character pattern stored in said shift register, said second detection circuit being adapted to generate a said second decision signal a predetermined fifth time interval after the beginning in said predetermined storage cell of a series of information signals representing a white or substantially white portion or space of said character pattern and on condition that said series has a predetermined minimum duration and on the further condition that said registering means have been operated and remain operated during said minimum duration.

12. The character recognition device according to claim 11 wherein said predetermined minimum duration is equal to a sixth time interval which is smaller than said fifth time interval.

13. The character recognition device according to claim 11 wherein said predetermined first storage cell and said fifth time interval are such that said second decision signal normally occurs in time coincidence with said first decision signal.

14. The character recognition device according to claim 11 wherein said second detection circuit includes a second bistable device constituting said first registering means, a third bistable device, a second and a third timing circuit adapted to produce an output signal after their input has been activated for said sixth time interval and for a seventh time interval equal to the difference between said fifth and sixth time intervals respectively, and a third AND-gate wherein one output of said predetermined storage cell of said shift register is coupled to the 1-input of said second bistable device, the 1-output of which controls said third AND-gate which is also controlled by the inverse of said one output of said predetermined cell, wherein the output of said third AND-gate is coupled to the input of said second timing circuit, the output of which is coupled to the 1-input of said third bistable device, and wherein the 1-output of said third bistable device is coupled to the input of said third timing circuit, the output of which constitutes said output of said second detection circuit.

15. The character recognition device according to claim 14 wherein said one output of said predetermined first cell is connected to the 1-input of said second bistable device via a fourth AND-gate which is controlled by said common output of said detection circuits via an inverter.

16. The character recognition device according to claim 14 wherein said common output of said detection circuits is connected to the 0-inputs of said second and third bistable devices respectively.

17. An improved character recognition device of the type including scanning means for scanning characters to be recognized, a shift register with storage cells, means for storing information signals derived from the scanning means into the shift register, and a character recognition circuit coupled to predetermined storage cells of the shift register and producing an output signal each time the pattern of information signals in the shift register corresponds to the scanning of the associated character to be recognized, wherein the improvement comprises a plurality of detection circuits, inputs of which are coupled to said shift register and each adapted to detect a distinct feature related to said pattern of information signals in said shift register and to subsequently produce a corresponding decision signal, the outputs of said detection circuits being connected to said character recognition circuit which effects the recognition of said pattern upon the receipt of a said decision signal, wherein a third of said detection circuits is adapted to detect the beginning of a character pattern stored by means of information signals in said shift register and to produce at its output a third decision signal after such detection, and wherein said third detection circuit includes a second registering means to register the occurrence in a predetermined second storage cell of said shift register of an information signal representing a black or substantially black portion of a character pattern stored in said shift register, said third detection circuit being adapted to generate a said third decision signal at least a predetermined eighth time interval after said second registering means have been operated and on condition that said second registering means remain operated during a ninth time interval which is smaller than said eighth time interval.

18. The character recognition device according to claim 17 wherein said third detection circuit includes third inhibiting means preventing the operation of said third timing circuit during a predetermined tenth time interval after the occurrence of a said decision signal.

19. The character recognition device according to claim 18 wherein said predetermined first and second storage cells are the same, and said third detection circuit includes said second and third bistable devices, said third timing circuit, said fourth AND-gate, a first AND-gate, a third monostable device, and a fourth timing circuit adapted to produce an output signal after its input has been activated for said ninth time interval, wherein the 1-output of said second bistable device is coupled to the input of said fourth timing circuit via said first AND-gate which is also controlled by the )-output of said third monostable device forming part of said third inhibiting means and having a time constant equal to said tenth time interval, and wherein the output of said third timing circuit is coupled to the 1-input of said third bistable device.

20. The character recognition device according to claim 17 wherein said predetermined second storage cell and said eighth time interval are such that said third decision signal normally occurs in time coincidence with said first decision signal.

21. The character recognition device according to claim 17 wherein the sum of said eighth and ninth time intervals is equal to the period at which the characters to be recognized are fed to the recognition device.

* * * * *

UNITED STATES PATENT OFFICE

CERTIFICATE OF CORRECTION

Patent No. 3,771,127 Dated November 6, 1973

Inventor(s) Luciaan H. E. Van Heddegem

It is certified that error appears in the above-identified patent and that said Letters Patent are hereby corrected as shown below:

30 Add -- Foreign Application Priority Date

February 25, 1971 The Netherlands ------- 7102555

Signed and sealed this 14th day of May 1974.

(SEAL)
Attest:

EDWARD M. FLETCHER, JR.
Attesting Officer

C. MARSHALL DANN
Commissioner of Patents